United States Patent

Iida et al.

[15] 3,660,780

[45] May 2, 1972

[54] SEMICONDUCTOR LASERS

[72] Inventors: Seishi Iida, Fujisawa; Yoichi Unno, Kamakura, both of Japan

[73] Assignee: Tokyo Shibaura Electric Co., Ltd., Kawasaki-shi, Japan

[22] Filed: May 26, 1970

[21] Appl. No.: 40,608

[30] Foreign Application Priority Data

May 28, 1969 Japan....................................44/40905
Mar. 7, 1970 Japan....................................45/19051

[52] U.S. Cl. ..........................................331/94.5, 317/234 R
[51] Int. Cl...............................................................H01s 3/18
[58] Field of Search ..............331/94.5; 317/235 N; 307/312; 313/108 D

[56] References Cited

UNITED STATES PATENTS 3,353,114 11/1967 Hanke et al............................331/94.5
3,483,487 12/1967 Nanney et al..........................331/94.5

*Primary Examiner*—Ronald L. Wibert
*Assistant Examiner*—Edward S. Bauer
*Attorney*—Flynn & Frishauf

[57] ABSTRACT

In a semiconductor laser comprising a body of semiconductor laser material which is caused to radiate coherent light by a pumping input, at least two electrodes are provided adjacent the reflective end surfaces or longitudinal edges and a control voltage is impressed across the electrodes to reduce multifrequency modes to a single central frequency mode or to a central frequency mode with a minority of side band modes.

10 Claims, 12 Drawing Figures

$\alpha = 1.5$ $\left(\frac{\delta\nu}{\Delta\nu}\right) = 1\times10^{-2}$ $\mu = 3000\ Cm^2/V.Sec$ $\tau = 3\times10^{-9}\ Sec$ $\lambda = 9000\ \text{Å}$

SEMICONDUCTOR LASERS

BACKGROUND OF THE INVENTION

This invention relates to a semiconductor laser, and more particularly to increase of output power of particular modes by suppression of multimode oscillations of a semiconductor laser.

It is well known in the art that the laser action of a semiconductor laser material is initiated when population inversion which is produced by pumping input becomes sufficient to overcome the loss of the laser. The population inversion is a condition under which there are more carriers in the high energy state than the low energy state. This condition is also called the negative temperature condition.

A semiconductor laser which radiates coherent light with uniformly broadened spectral line exhibits multimode oscillations like a solid state laser. It is considered that these multimode oscillations are caused by variations of the distribution of the negative temperature condition of the laser material in terms of time or space. Under the steady state condition, multimode oscillations are caused by the spatial non-uniformity of the negative temperature distribution of the laser material.

The term "spatial non-uniformity of the negative temperature within an optical resonator filled with homogeneous laser material" means that the negative temperature distribution becomes non-uniform due to the spatial distribution of the electric field of oscillating electromagnetic waves. The standing wave nature of oscillating modes de-excites excess population most strongly at anti-nodes and not at all at nodes of the electric field. Under these conditions, the excess population condition that has not been dissipated in the oscillating mode contributes to the gain of other modes, thus causing these modes to oscillate.

It is well known in the art that the multimode oscillations of poor spectral purity are harmful to the utilization of the laser output for various purposes. Ideally, it is highly desirable that the laser output should have a single mode.

In gas and solid state lasers, the multimode oscillations have been suppressed by setting a new boundary condition in the optical resonator. With such an approach, however, although it is possible to decrease the number of modes, the power of the oscillating mode is not improved.

In the semiconductor laser, in most cases, it is thought that mobile electrons and/or holes are related to the radiative transition so that if it were possible to mobilize these carriers it would be possible to alleviate or eliminate the spatial non-uniformity of the negative temperature distribution thus concentrating the laser output to a single central frequency mode or to this central frequency mode and a small number of side band modes accompanying therewith.

It has been reported that in a conventional semiconductor laser concerning the mobile carriers of a conductive semiconductor body such spatial non-uniformity of the negative temperature distribution can be partially alleviated by the diffusion of mobile carriers (see for example, a paper of H. Statz et al. in "Journal of Applied Physics" vol. 35 p. 2581 (1964)).

We have investigated such natural diffusion of carriers and found that the effect of mode suppression is not remarkable.

It is an object of this invention to provide a novel semiconductor laser capable of suppressing undesirable modes among multimodes.

Another object of this invention is to provide an improved semiconductor laser having large output power.

SUMMARY OF THE INVENTION

According to this invention, a control voltage or field is applied to a body of semiconductor laser material which is caused to radiate a coherent light by a pumping input, and thus the carriers contributing to light emission of the body are caused to be moved to a portion of large anti-node of electric field of standing wave for producing the stimulated light emission at that portion, thus suppressing the oscillation modes.

According to this invention there is provided a semiconductor laser device comprising a body of a semiconductor laser material in which a laser action is initiated by a pumping input, said body including a plurality of reflective end surfaces formed at opposite ends of the semiconductor body, and at least two electrodes secured to said body across which a control voltage is impressed to mobilize carriers contributing to radiation along said plane.

DESCRIPTION OF THE PREFERRED EMBODIMENTS

Figure 1:
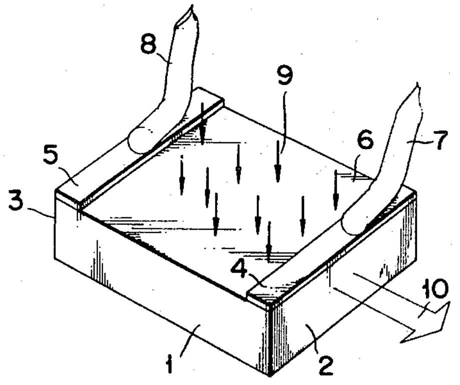
FIG. 1 is a perspective view of a semiconductor laser embodying this invention.

Referring now to FIG. 1 illustrating a preferred embodiment of this invention there is shown a semiconductor laser comprising a body 1 of a laser material prepared by doping an N-type impurity or a P-type impurity into a gallium arsenide crystal for example. The N-type impurity may be tellurium, silicon or tin, for example, while the P-type impurity may be zinc or cadmium, for example, and in each case an impurity concentration of about $10^{18}/cm^3$ is preferred.

On the opposite ends of the body of the laser material 1 are formed parallel surfaces 2 and 3 by grinding or cleavage of the crystal.

Since semiconductor materials generally have a large index of refraction, surfaces 2 and 3 function as reflective surfaces for the light impinging thereon and have partial transmissibility for deriving the light output out of the laser, thus constituting a Fabry-Perot resonator or cavity in a manner well known in the art. Since one of the reflective surfaces, for example, surface 3 is not necessarily required to have transmissibility, this surface may be made totally reflective by vapor depositing thereon a relatively thick layer of a reflective substance, silver for example. The other reflective surface 2 may be deposited with a relatively thin layer of the reflective substance to permit partial transmission of the light supplied thereto.

By a conventional technique two electrodes 4 and 5 are applied on the opposite ends of the upper surface 6 of the body of laser material 1 adjacent end reflective surfaces 2 and 3.

A preferred electrode material is for example an alloy of gold and zinc or an alloy of indium and zinc where the body of laser material is comprised by P-type gallium arsenide, or an alloy of tin and indium where the body is comprised by N-type gallium arsenide. Where a thick silver layer is vapor deposited upon one of the end surfaces 2 and 3, this silver layer can also be utilized as one of the electrodes.

A pair of lead wires 7 and 8 made of a suitable electroconductive material, such as gold, are securely bonded to electrodes 4 and 5, respectively.

A control voltage is applied across lead wires 7 and 8 or electrodes 4 and 5 from a suitable source, not shown, in order to move carriers in a direction perpendicular to the reflective surfaces, that is, along the pumping input receiving surface 6.

It should be noted that the laser action is initiated when a pumping power produces an efficient population inversion in the energy system of the body of the laser material without applying a voltage across electrodes 4 and 5. The pumping input which may be an electron beam or light beam is indicated by arrows 9 and the coherent light output from the laser through the partially transmissive reflective surface 2 is indicated by an arrow 10 as shown in FIG. 1.

As will be discussed later in more detail, the laser output obtained from the semiconductor laser by applying a pumping input but without applying a voltage across electrodes 4 and 5 contains multifrequency modes and as the mode suppression control input voltage impressed upon the electrodes is increased, the multifrequency modes are gradually suppressed starting from those remote from the central frequency mode with the result that the outputs of the not suppressed modes increase gradually.

The theory of this invention and the results of calculations will now be considered with reference to the drawing. In the following, a one-dimensional analysis will be made on an axial mode of a Fabry-Perot resonator or cavity having a mirror spacing L (distance between both reflective surfaces).

The relationship among time $t$, the negative temperature distribution $n(z, t)$ at a portion $z$ and the number of photons $N_i(t)$ of $i$ mode is given by the following coupled rate equations $$\frac{d(z,t)}{dt}=\frac{n(z,t)-\overline{n}}{\tau}-\sum_{i}^{J} Dg_i n(z,t) E_i(z,t) \qquad (1)$$

$$\frac{dN_i(t)}{dt}=-\gamma_i N_i(t)+Dg_i\int_0^L n(z,t)E_i(z,t)\,dz \qquad (2)$$

where $\overline{n}$ represents the value of $n(z)$ at steady state in the absence of the stimulated light emission, $\tau$ the life of the spontaneous emission, $g_i$ the gain of $i$ mode and $\tau_i$ the rate of the loss of the number of photons per unit time. The term $E_i(z,t)$ is proportional to the energy density of the $i$ mode at time t and at portion $z$ and is given by the following equation by taking into consideration the standing wave.

$$E_i(z,t)=N_i(t)[1-\cos(2m_i\pi/L)z] \qquad (3)$$

where $m_i$ represents an integer designating a mode.

In the prior art laser, during the oscillation under steady state, following relations hold $dn/dt=0, dN_i/dt=0$ In this invention, upon application of the field $E$ carriers having a mobility $\mu$ are moved in the direction $z$ at a velocity of $V=\mu E$, and thus following equation holds $$\frac{dn}{dt}=\frac{\delta n}{\delta t}+V\frac{\delta n}{\delta z}=\frac{\delta n}{\delta t}+\mu E\frac{\delta n}{\delta z} \qquad (4)$$

By the substitution of these Equations (3) and (4) and the conditions of steady state ($\delta n/\delta t=0$, $dN_i/dt=0$) Equations (1) and (2) become $$\mu E\frac{dn(z)}{dz}=-\frac{n(z)-\overline{n}}{\tau}-\sum_{i}^{j}Dg_i n(z)N_i[1-\cos\,(2m_i\pi/L)z] \qquad (5)$$

$$O=-\gamma_i N_i+Dg_i\int_0^L n(z)N_i[1-\cos\,(2m_i\pi/L)z]dz \qquad (6)$$

Under a condition wherein the pumping input level is not substantially higher than the threshold level of oscillation, the solution of Equation (5) is given by $$n(z)=\overline{n}\Big[1-D\tau\sum_{i}^{j}g_iN_i+D\tau\sum_{i}^{j}g_iN_i\sqrt{h_i}/(1+h_i)\cdot\sin\,(2m_i\pi/L)z+d\tau\sum_{i}^{j}g_iN_ih_i/(1+h_i)\,\cos\,(2m_i\pi/L)z\Big] \qquad (7)$$

in which $h_i$ is given by $$h_i=\left(\frac{L}{2m_i\pi\tau\mu E}\right)^2 \qquad (8)$$

In an actual semiconductor laser, since $m_i$ is a large number, it is possible to neglect the dependency of $h_i$ upon $i$ so that Equation (8) can be rewritten as $$h=(\lambda/4\pi\tau\mu E)^2 \qquad (9)$$

where $\lambda$ represents the central wave length of the radiation of the spectral line.

By substituting Equation (7) into Equation (6) the number of the photons $N_i$ when the laser is oscillating with $j$ modes is given by the following equation:

$$N_i=\frac{2}{D\tau g_i}\,\frac{1+h}{h}\left[1-\frac{\gamma i}{Dng_iL}-\frac{2}{2j+h/(1+h)}\sum_{l=1}^{j}\left(1-\frac{\gamma l}{D\overline{n}g_iL}\right)\right] \qquad (10)$$

Considering that diffusion of excess population plays an important roll for the multimode oscillation of a semiconductor laser, Statz et al. added a term $\theta(d^2n/dt^2)$ (where $\theta$ represents the diffusion constant) related to this diffusion to the right hand side of Equation (1) and solved Equation (1) under a condition of $dn/dt = dN/dt = 0$ to obtain an equation representing $N_i$.

On the contrary, Equation (10) derived as above described shows that it is equal to the equation of Statz et al. but modified by substituting $\epsilon = h/1+h$, in the equation of Statz et al. where $\epsilon$ was defined as $\epsilon = [1 \times \theta\tau(4\pi/\lambda)^2]^{-1}$. It will be readily understood that application of voltage across electrodes of the semiconductor laser to mobilize carriers causes the effect corresponding to natural diffusion.

The pumping parameter $\alpha$ representing the intensity of the pumping input causing the stimulated light emission is defined by the equation:

$$\alpha=\frac{LDg_i\overline{n}}{\gamma_1} \qquad (11)$$

Further, assuming that the radiation spectral line is the Lorentzian, the gain $g_i$ of the $i$ mode can be approximated by the following equation:

$$g_i\approx 1-4(i-1)^2\left(\frac{\delta\nu}{\Delta\nu}\right)^2 \qquad (12)$$

where $\delta\nu$ represents the spacing between axial modes, and $\Delta\nu$ the half width of the radiation spectral line.

The emission of a semiconductor laser is governed by various factors. Thus, the emission of pure crystals or crystals of low impurity concentration is caused by the exitons or the isolated donors or acceptors, whereas in the case of the emission of high impurity concentration, it is believed to be caused by interband transition since the impurity level is merged to the band. With a semiconductor crystal of high impurity concentration application of the voltage mobilizes the carriers which contribute the light emission so that the above described theory is applicable to the semiconductor laser containing mobile carriers.

In the P-type laser material spatial non-uniform distribution of minority carriers, or electrons cause the multimode oscillations whereas in the N-type laser material the spatial non-uniform distribution of the minority carriers, or holes is important. Accordingly, in each case it is possible to suppress multimodes by mobilizing the minority carriers by the impressed field.

The following descriptions are made with respect to P-type and N-type gallium arsenide semiconductor lasers which are presently believed to be the lasers having the best potential value in the future.

The table below shows values of pumping parameter $\alpha$ at which from the first to seventh modes oscillate for certain values of $\delta\nu$, $\Delta\nu$, $\mu$ and E where $\tau$ equals $3 \times 10^{-9}$ sec.

TABLE

| | $\left(\frac{\delta\nu}{\Delta\nu}\right)=1\times10^{-2}$ λ=9,000 A. | | $\left(\frac{\delta\nu}{\Delta\nu}\right)=2\times10^{-2}$ λ=8,400 A. | |
|---|---|---|---|---|
| | $\mu$=3,000 cm.²/V. sec. | $\mu$=100 cm.²/V. sec. | $\mu$=3,000 cm.²/V. sec. | $\mu$=100 cm.²/V. sec. |
| i=1 for all E's | 1.000 | 1.000 | 1.000 | 1.000 |
| E=0 V/cm | 1.001 | 1.001 | 1.005 | 1.005 |
| i=2: | | | | |
| 1 | 1.002 | 1.001 | 1.011 | 1.005 |
| 10 | 1.128 | 1.001 | 1.586 | 1.005 |
| 100 | 13.64 | 1.015 | 59.11 | 1.069 |
| E=0 V/cm | 1.007 | 1.007 | 1.029 | 1.029 |
| i=3: | | | | |
| 1 | 1.016 | 1.007 | 1.070 | 1.029 |
| 10 | 1.893 | 1.008 | 5.119 | 1.034 |
| 100 | 89.60 | 1.106 | 410.0 | 1.483 |

Table – Continued

| | $\left(\frac{\delta\nu}{\Delta\nu}\right)=1\times10^{-2}$ λ=9,000 A. | | $\left(\frac{\delta\nu}{\Delta\nu}\right)=2\times10^{-2}$ λ=8,400 A. | |
|---|---|---|---|---|
| | μ=3,000 cm.²/V. sec. | μ=100 cm.²/V. sec. | μ=3,000 cm.²/V. sec. | μ=100 cm.²/V. sec. |
| E=0 V/cm | 1.021 | 1.021 | 1.086 | 1.086 |
| i=4: | | | | |
| 1 | 1.049 | 1.021 | 1.216 | 1.086 |
| 10 | 3.812 | 1.024 | 14.06 | 1.101 |
| 100 | 280.1 | 1.331 | 1,299 | 2.528 |
| E=0 V/cm | 1.047 | 1.047 | 1.191 | 1.191 |
| i=5: | | | | |
| 1 | 1.110 | 1.047 | 1.490 | 1.191 |
| 10 | 7.410 | 1.054 | 31.08 | 1.224 |
| 100 | 637.4 | 1.754 | 2,990 | 45.12 |
| E=0 V/cm | 1.087 | 1.087 | 1.360 | 1.360 |
| i=6: | | | | |
| 1 | 1.208 | 1.087 | 1.938 | 1.861 |
| 10 | 13.23 | 1.100 | 59.15 | 1.425 |
| 100 | 1,216 | 2.436 | 5,781 | 7.782 |
| E=0 V/cm | 1.146 | 1.146 | 1.613 | 1.613 |
| i=7: | | | | |
| 1 | 1.353 | 1.156 | 2.615 | 1.614 |
| 10 | 21.83 | 1.169 | 101.7 | 1.725 |
| 100 | 2,070 | 3.444 | 10,010 | 12.74 |

In this case, the spacing $\delta\nu$ between axial modes is assumed to be 3 angstroms. As typical values of a gallium arsenide laser at room temperature, wave length $\lambda$ of 9,000 angstroms as the central wave length of the spectral line and the halfwidth $\Delta\nu$ of 300 angstroms of this spectral lines are used. Further, as typical values at the liquid nitrogen temperature $\lambda$ of 8,400 angstroms and $\Delta\nu$ of 150 angstroms are used.

By assuming that the value of mobility of electrons, that is, the minority carriers in a high impurity concentration P-type gallium arsenide, is substantially equal to that of electrons that is the major carriers in an N-type crystal, the value of the mobility of 3,000 $cm^2$/V.sec. of electrons is used. And the value of the mobility of 100 $cm^2$/V.sec. of holes, or the minority carriers in high impurity concentration N-type gallium arsenide is used.

The table shows that in the case of P-type gallium arsenide where $\delta\nu/\Delta\nu$ equals $1 \times 10^{-2}$ and the mobility $\mu$ equals 3,000 $cm^2$/Vsec., the second mode oscillates at a pumping parameter $\alpha$ of 1.001 in the absence of applied field (that is $E = 0$) and that when a field $E$ of 100 V/cm is impressed no oscillation occurs until $\alpha$ reaches a value of 13.64. This means that as the applied field increases, oscillation of sideband modes becomes more difficult.

Figure 2:
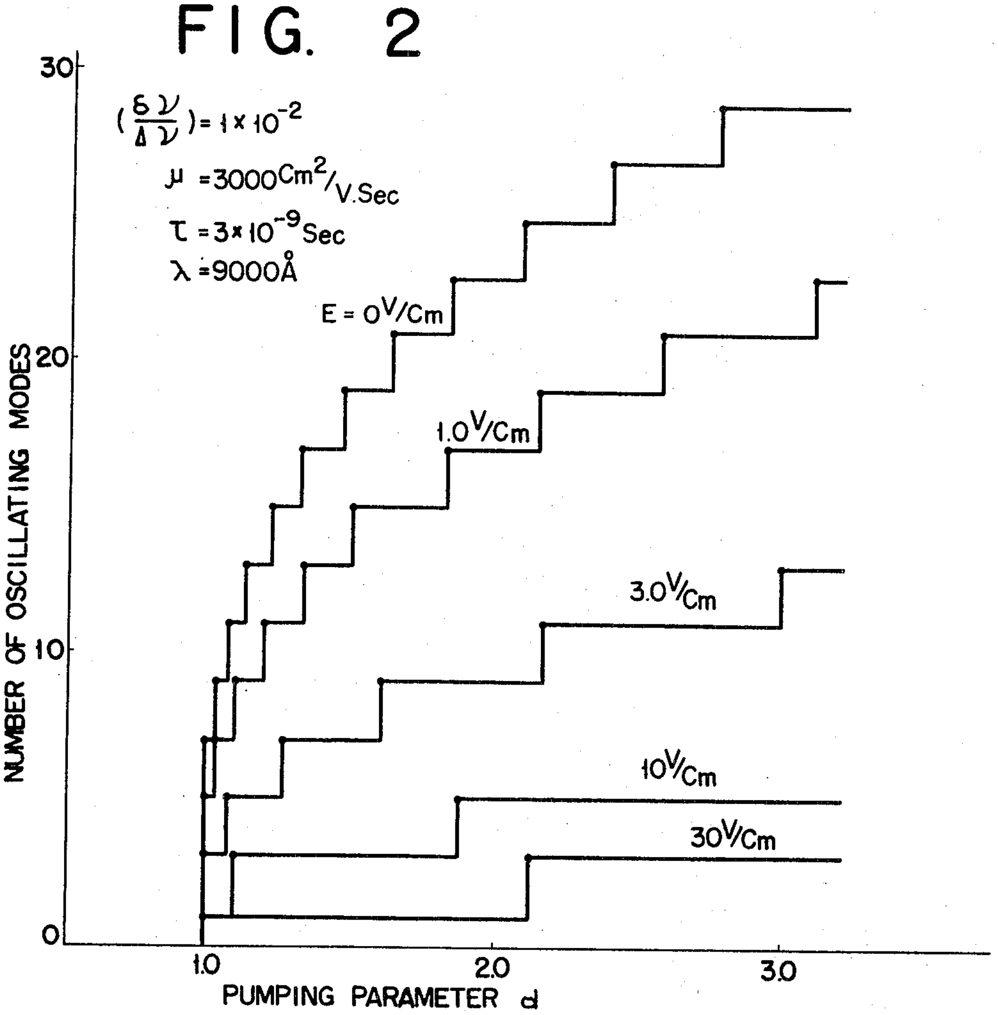
FIG. 2 is a plot showing the relationship between the pumping parameter $\alpha$ and the number of oscillation modes by taking the intensity of the field as the parameter.
Figure 3A:
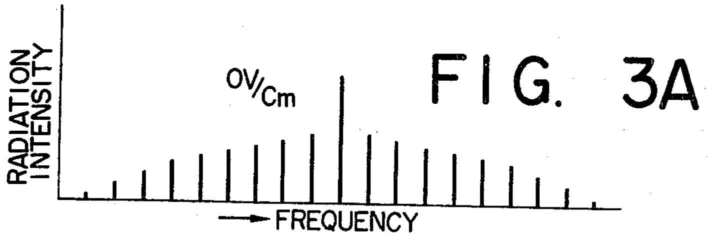
FIGS. 3A to 3E show characteristics of oscillation spectrum calculated by taking the intensity of applied field E as the parameter for the case in which pumping parameter $\alpha$ equals 1.5.
Figure 3B:
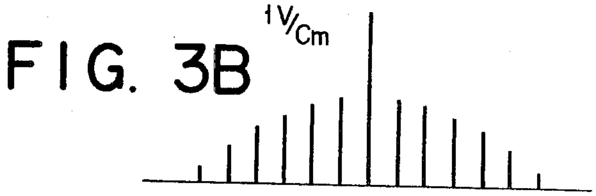
Figure 3C:
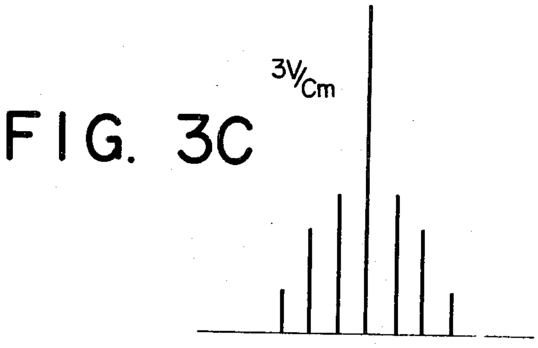
Figure 3D:
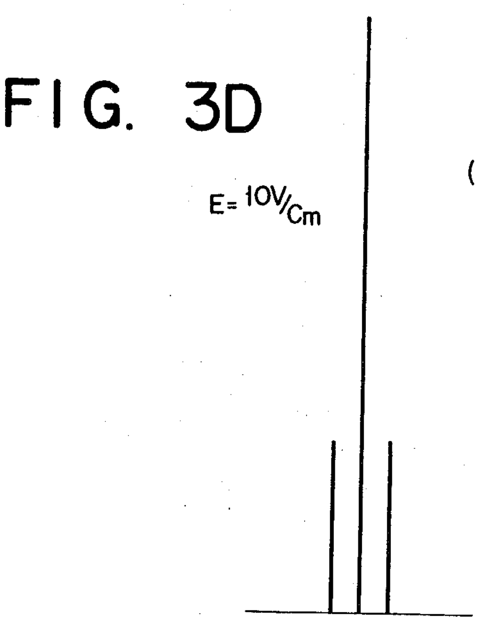
Figure 3E:
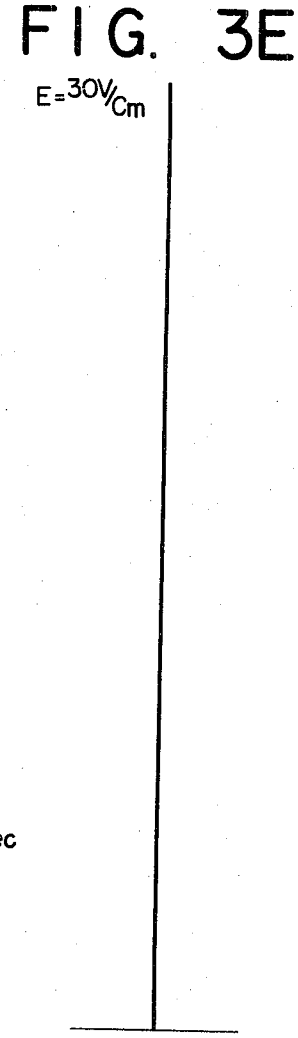

FIG. 2 shows the relationship between pumping parameter $\alpha$ and the number of oscillation modes, taking the impressed field E as the parameter. Thus, for example, where pumping parameter $\alpha$ equals 1.5, the number of oscillating modes obtained is 19 at an applied field $E = 0$, 7 when $E$ equals 3 volts per centimeter, 3 when $E$ equals 10 volts per centimeter and one when $E$ equals 30 volts per centimeter. From FIG. 2, it can be noted that the number of oscillating modes decreases with the increase of the applied field E.

FIGS. 3A to 3E show mode spectra obtained by the calculation for a value of the pumping parameter $\alpha$ of 1.5, again taking the field $E$ as the parameter. The relative value of the radiation intensities are shown by a common scale for various values of E. FIGS. 3A to 3E inclusive show the manner in which the respective mode outputs vary dependent upon the value of E or the outputs are subjected to intensity modulation.

More particularly, at an impressed field $E$ above a definite value, the outputs distributed over multimodes are gathered toward a mode at the center of the spectral lines. Thus a single mode can be obtained without varying the total output. Or the total output is supposed to increase by chance. This arises from the fact that where there is impressed an electric field, the population which has not contributed to oscillation is made to do so due to the presence of the electric field. This constitutes a very advantageous feature of the invention when compared with the prior art method in which mode suppression is realized by setting a new boundary condition in the resonator.

According to one example of this invention, P-type gallium arsenide of an impurity concentration of about $10^{18}/cm^3$ was used and a sample was prepared therefrom having standard dimensions, 300 microns long, 300 microns wide and 100 microns thick. The resistivity $\rho$ of this sample was 0.01 ohm-cm. A voltage of 0.3 V was impressed upon the sample giving an intensity of the field of 10 V/cm and the current was about 100 miliamperes. This invention is very advantageous because the desired mode suppression effect can be readily provided with such low voltage and low current.

Figure 4:
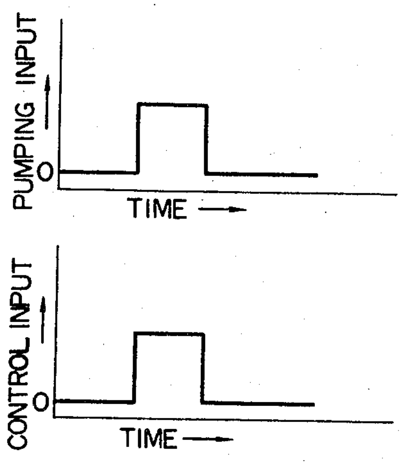
FIG. 4 is a plot to explain the time relationship between the pumping input and the control input controlling the oscillation mode.

At present, in the semiconductor laser of the type described above, the pumping input is generally applied in the form of a pulse for the purpose of preventing variations in the characteristics due to heating of the laser body caused by the pumping input. Accordingly, when a control voltage in the form of a pulse or an intermittent current is applied in synchronism with the pumping input as diagrammatically shown in FIG. 4 it is possible not only to suppress the modes but also prevent variation in the characteristics caused by the heating of the laser element. It is to be understood that the control voltage is not limited to a pulse but a D.C. or an A.C. voltage can also suppress the modes.

Although the above described semiconductor laser is composed of gallium arsenide, this invention is not limited to this particular substance and other substances may also be used including semiconductor materials of the group III–VI compounds such as gallium antimonide, indium phosphide, indium antimonide and indium arsenide; semiconductor materials of the group IV–VI compounds such as lead sulfide, lead selenide and lead telluride; semiconductor materials of the ternary compounds such as gallium arsenide-phosphide, indium-gallium arsenide, lead-tin telluride, lead-tin selenide and mercury-cadmium telluride; and an element such as tellurium. Materials having high mobility of carriers are suitable as the laser materials of this invention. Carriers are also mobilized by magnetic field instead of electric field.

Although in the foregoing description, the invention has been described in terms of a bulk semiconductor laser element of either P-type or N-type material excited by an electron beam or light, the principle of this invention is equally applicable to the so-called injection laser including a P-N junction between a degenerate N-type crystal and a P-type crystal and which is pumped by applying a voltage across the P-N junction in the forward direction.

Figure 5:
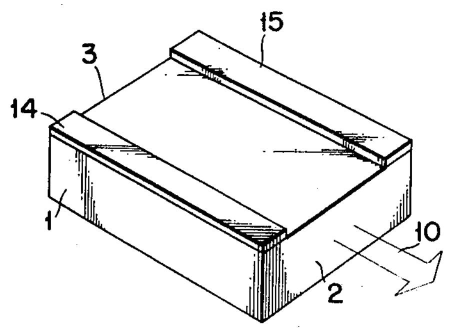
FIGS. 5 to 8 show perspective views of other different embodiments of this invention.

Although in the foregoing embodiment, carriers are mobilized in a direction perpendicular to the reflective surfaces, as shown in FIG. 5 a pair of electrodes 14 and 15 may be disposed at the longitudinal edges of the body of the laser active material 1 in parallel with the axis thereof to mobilize carriers in the direction parallel to reflective surfaces 2 and 3. In the semiconductor laser, filamentary oscillations appear on the reflective surfaces often due to non-uniformity of the pumping input as well as due to the impurity concentration at different portions, but where the carriers are mobilized in parallel with the reflective surfaces the active region becomes homogeneous thus eliminating the filamentary oscillations. Or, an increase of the population in the filamentary region increases the laser output. In any case, where the carriers are mobilized in parallel with the reflective surfaces it is possible to increase the laser output and to decrease the oscillation threshold value.

Figures 6, 7, 8:
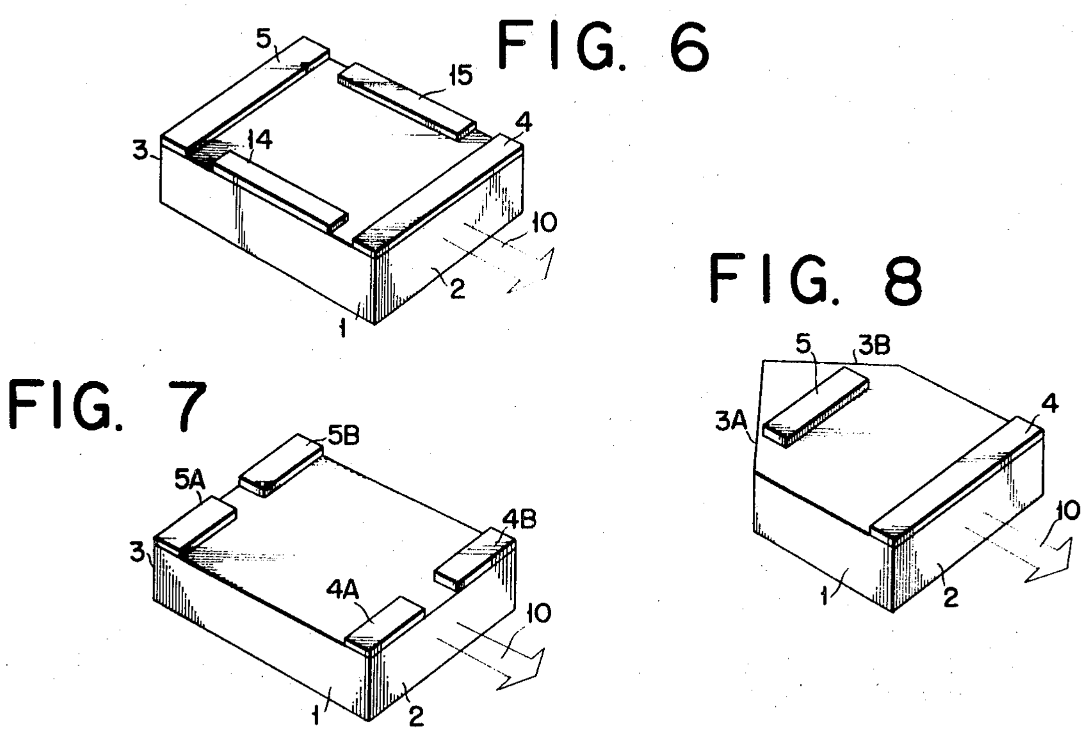

FIG. 6 shows a modified embodiment of this invention corresponding to a combination of those shown in FIGS. 1 and 5 wherein carriers are mobilized along the pumping input receiving surface 6 and in the direction at an angle with respect to the reflective surfaces 2 and 3. Thus, electrodes 2, 3 and 14, 15 are secured to the axial end edges and longitudinal edges of the body of laser material 1. Again, it is possible to vary the oscillation modes and to increase the laser output. In addition, filamentary oscillations are eliminated.

In another embodiment shown in FIG. 7, each of the electrodes 4 and 5 shown in FIG. 1 is divided into two electrode sections 4A, 4B and 5A, 5B. In this case, a potential difference is established between electrode sections 4A and 5A and between electrode sections 4B and 5B. It is also possible to apply a potential difference between electrode sections 4A and 4B and between electrode sections 5A and 5B.

Although each of the above described embodiments refers to a Fabry-Perot cavity having two parallel reflective surfaces, the novel laser may be provided with three reflective surfaces 3A, 3B and 2 as shown in FIG. 8. In this construction, reflective surfaces 3A and 3B which may be totally reflective surfaces intersect each other at a right angle and each makes an angle of 45° with respect to the other partially transmissive reflective surface 2 through which the laser output is derived out. Electrode 4 is secured to one end of the body of laser active material close to the output reflective surface while the other electrode 5 is disposed close to reflective surfaces 3A and 3B.

In the embodiments shown in FIGS. 5 to 8, portions corresponding to those shown in FIG. 1 are designated by the same reference numerals and pumping inputs and lead wires have been eliminated for the sake of clearness.

What we claim is:

1. A semiconductor laser device having suppressed multimode oscillations comprising:

a body of semiconductor laser material for producing a coherent light output responsive to a pumping input;

a surface on said semiconductor body for receiving said pumping input;

a plurality of reflective faces formed at opposite ends of said semiconductor body, the coherent light output being derived through at least one of said reflective faces; and at least two electrodes secured to said semiconductor body across which a control voltage is impressed to move carriers contributing to light emission within said semiconductor body along said pumping input receiving surface thereby suppressing multimode oscillations included in the light output of said semiconductor body.

2. The semiconductor laser as claimed in claim 1 wherein said reflective surfaces are formed in parallel with each other at opposite ends of said body of laser material and said electrodes are disposed in parallel adjacent said reflective surfaces.

3. The semiconductor laser as claimed in claim 2 wherein each of said electrodes is divided into a plurality of sections.

4. The semiconductor laser as claimed in claim 1 wherein said reflective surfaces are formed in parallel with each other at opposite ends of said body of laser material and said electrodes are disposed along and adjacent to the longitudinal side edges of said body.

5. The semiconductor laser as claimed in claim 1 wherein said reflective surfaces are formed in parallel with each other at opposite ends of said body and said electrodes are disposed adjacent the opposite ends and longitudinal side edges of said body.

6. The semiconductor laser as claimed in claim 1 wherein said reflective surfaces comprise two totally reflective surfaces intersecting at a right angle and a third reflective surface which makes an angle of 45° with respect to said two totally reflective surfaces and through which the laser output is derived, and said electrodes are disposed adjacent said totally reflective surfaces and said third reflective surface.

7. The semiconductor laser as claimed in claim 1 wherein said pumping input applied to said body of laser material is a pulsed input and wherein said control voltage is a pulsed voltage applied in synchronism with said pumping input.

8. The semiconductor laser as claimed in claim 1 wherein at least one of said reflective faces is a partially reflective face.

9. The semiconductor laser as claimed in claim 1 including two reflective surfaces formed in parallel with each other at opposite ends of said body of laser material, one of said reflective faces being totally reflective and the other of said reflective faces being partially reflective.

10. The semiconductor laser as claimed in claim 1 wherein said pumping input receiving surface is perpendicular to said reflective faces, said electrodes being secured to said pumping input receiving surface.

* * * * *